(12) United States Patent
Jung

(10) Patent No.: US 10,262,621 B2
(45) Date of Patent: Apr. 16, 2019

(54) DISPLAY DEVICE FOR MITIGATION OF DC VOLTAGE STRESS, AND DRIVING METHOD THEREOF

(71) Applicant: LG Display Co., Ltd., Seoul (KR)

(72) Inventor: Healn Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 15/683,340

(22) Filed: Aug. 22, 2017

(65) Prior Publication Data

US 2018/0061358 A1    Mar. 1, 2018

(30) Foreign Application Priority Data

Aug. 30, 2016  (KR) .......... 10-2016-0110599

(51) Int. Cl.
*G09G 3/36* (2006.01)
*G09G 3/34* (2006.01)
*G02F 1/1335* (2006.01)

(52) U.S. Cl.
CPC ..... *G09G 3/3696* (2013.01); *G02F 1/133602* (2013.01); *G09G 3/3406* (2013.01); *G09G 3/3614* (2013.01); *G09G 2310/0264* (2013.01); *G09G 2320/04* (2013.01); *G09G 2340/0435* (2013.01)

(58) Field of Classification Search
CPC ......... G09G 3/3614; G09G 2340/0435; G09G 2320/0257; G09G 2320/0266; G09G 2320/04

See application file for complete search history.

(56) References Cited

U.S. PATENT DOCUMENTS

2011/0221870 A1* 9/2011 Huang .................... G09G 3/003
348/51
2017/0047028 A1* 2/2017 Seo ....................... G09G 3/3648

* cited by examiner

*Primary Examiner* — Laurence J Lee
(74) *Attorney, Agent, or Firm* — Polsinelli PC

(57) ABSTRACT

Disclosed are a display device and a driving method thereof, which when a frame having a long time length and a frame having a short time length are alternately provided, prevent a DC voltage stress from being accumulated. One frame of a plurality of frames may be driven in the line inversion method, and a polarity may be delayed up to a next frame, thereby allowing polarities to be alternately supplied. Therefore, a time length of the positive voltage may be the same as that of the negative voltage, and thus, the positive voltage and the negative voltage may be continuously supplied based on a frequency of another frame, thereby solving a problem where the DC voltage stress is accumulated due to a difference between the time length of the positive voltage and the time length of the negative voltage.

20 Claims, 6 Drawing Sheets

| Frame 1 | Frame 2 | Frame 3 | Frame 4 | Frame 5 | Frame 6 | Frame 7 | Frame 8 |
|---|---|---|---|---|---|---|---|
| 40Hz | 75Hz | 40Hz | 75Hz | 40Hz | 75Hz | 40Hz | 75Hz |
| + | − | + | LINV 1 | − | + | − | LINV 2 |

FIG. 4

| Frame 1 | Frame 2 | Frame 3 | Frame 4 | Frame 5 | Frame 6 | Frame 7 | Frame 8 |
|---|---|---|---|---|---|---|---|
| 40Hz | 40Hz | 75Hz | 75Hz | 40Hz | 40Hz | 75Hz | 75Hz |
| + | − | + | − | + | − | + | − |

FIG. 5

RELATED ART

| Frame 1 | Frame 2 | Frame 3 | Frame 4 | Frame 5 | Frame 6 | Frame 7 | Frame 8 |
|---|---|---|---|---|---|---|---|
| 40Hz | 75Hz | 40Hz | 75Hz | 40Hz | 75Hz | 40Hz | 75Hz |
| + | − | + | − | + | − | + | − |

FIG. 7

| Frame 1 | Frame 2 | Frame 3 | Frame 4 | Frame 5 | Frame 6 | Frame 7 | Frame 8 |
|---|---|---|---|---|---|---|---|
| 40Hz | 75Hz | 40Hz | 75Hz | 40Hz | 75Hz | 40Hz | 75Hz |
| + | − | + | LINV 1 | − | + | − | LINV 2 |

FIG. 8

| Line order | 1 | 2 | 3 | 4 | 5 | 6 | 7 | 8 |
|---|---|---|---|---|---|---|---|---|
| LINV 1 | + | − | + | − | + | − | + | − |
| LINV 2 | − | + | − | + | − | + | − | + |

DISPLAY DEVICE FOR MITIGATION OF DC VOLTAGE STRESS, AND DRIVING METHOD THEREOF

CROSS-REFERENCE TO RELATED APPLICATION

This application claims the benefit of the Korean Patent Application No. 10-2016-0110599 filed on Aug. 30, 2016, which is hereby incorporated by reference in its entirety as if fully set forth herein.

BACKGROUND

Field of the Disclosure

The present disclosure relates to a display device, and more particularly, to a display device and a driving method thereof. Although the present disclosure is suitable for a wide scope of application, it is particularly suitable for preventing accumulation of a DC voltage stress on a display device when a long time length frame and a short time length frame are alternately provided in driving the display device and the driving method thereof.

Description of the Background

In information-oriented society, technology relevant to display devices displaying an image has been advanced for more effectively transferring visual information. The display devices include a display panel where a plurality of pixels for realizing a gray level based on a color and a level of a supplied voltage are arranged, a data driver that includes a source drive integrated circuit (IC) for supplying data voltages to the pixels, and a timing controller that controls the data driver.

A data driver control signal supplied from the timing controller allows the data driver to supply a positive voltage and a negative voltage which are inverted therebetween at every certain period. This is because when one of the positive voltage and the negative voltage is continuously applied, a direct current (DC) voltage stress is accumulated. Particularly, in liquid crystal display (LCD) devices that realize a gray level by using alignment of liquid crystal, when the DC voltage stress is accumulated into the liquid crystal, the liquid crystal is tilted in a specific direction, and for this reason, the gray level is not normally realized. Therefore, in order to solve a problem where the liquid crystal is tilted, the positive voltage and the negative voltage are alternately supplied at every one frame.

In order for the display panel to display various dynamic images, particularly, an adaptive sync (G-sync) mode where a driving frequency varies at every frame is applied for driving a screen, which is fast changed like a game screen. In the case where the driving frequency varies at every frame, a time length per one frame also varies. Particularly, in a general adaptive sync mode, a frame having a long time length and a frame having a short time length are alternately driven at every one frame, and thus, two driving frequencies are realized.

However, when only the positive voltage is continuously supplied in the frame having the long time length and only the negative voltage is continuously supplied in the frame having the short time length, the DC voltage stress is accumulated into a portion to which the positive voltage is supplied. Also, when only the negative voltage is continuously supplied in the frame having the long time length and only the positive voltage is continuously supplied in the frame having the short time length, the DC voltage stress is accumulated into a portion to which the negative voltage is supplied.

SUMMARY

Accordingly, the present disclosure is directed to provide a display device and a driving method thereof that substantially obviate one or more problems due to limitations and disadvantages of the related art.

An aspect of the present disclosure is directed to provide a display device and a driving method thereof, which when a frame having a long time length and a frame having a short time length are alternately provided, prevent a DC voltage stress from being accumulated.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display device including a display panel displaying an image, a data driver supplying a data voltage to the display panel, and a timing controller receiving digital video data and timing signals from a system board and supplying a data driver control signal to the data driver. When the display device is driven in an adaptive sync mode where a driving frequency for the digital video data is changed to a first driving frequency or a second driving frequency at every frame, the timing controller corrects the digital video data to supply correction digital video data to the data driver, so that a time length of a period corresponding to a positive voltage is the same as a time length of a period corresponding to a negative voltage.

In another aspect of the present disclosure, a driving method for a display device driven in an adaptive sync mode includes alternately driving odd frames with a first polarity voltage at a first driving frequency, and even frames with a second polarity voltage at a second driving frequency; and performing a line inversion driving after elapsing at least every three frames to allow a time length corresponding to the first polarity voltage to be the same as a time length corresponding to the second polarity voltage when the driven frames are summated.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings:

FIG. 4 is an exemplary diagram showing a frame-based polarity in an adaptive sync mode where a driving frequency varies at every two frames;

FIG. 5 is an exemplary diagram showing a frame-based polarity according to the related art in an adaptive sync mode where a driving frequency varies at every one frame;

FIG. 7 is an exemplary diagram showing a frame-based polarity according to an aspect of the present disclosure in an adaptive sync mode where a driving frequency varies at every one frame; and FIG. 8 is an exemplary diagram showing a frame-based polarity of each line in line inversion according to an aspect of the present disclosure.

DETAILED DESCRIPTION OF THE DISCLOSURE

Figure 1:
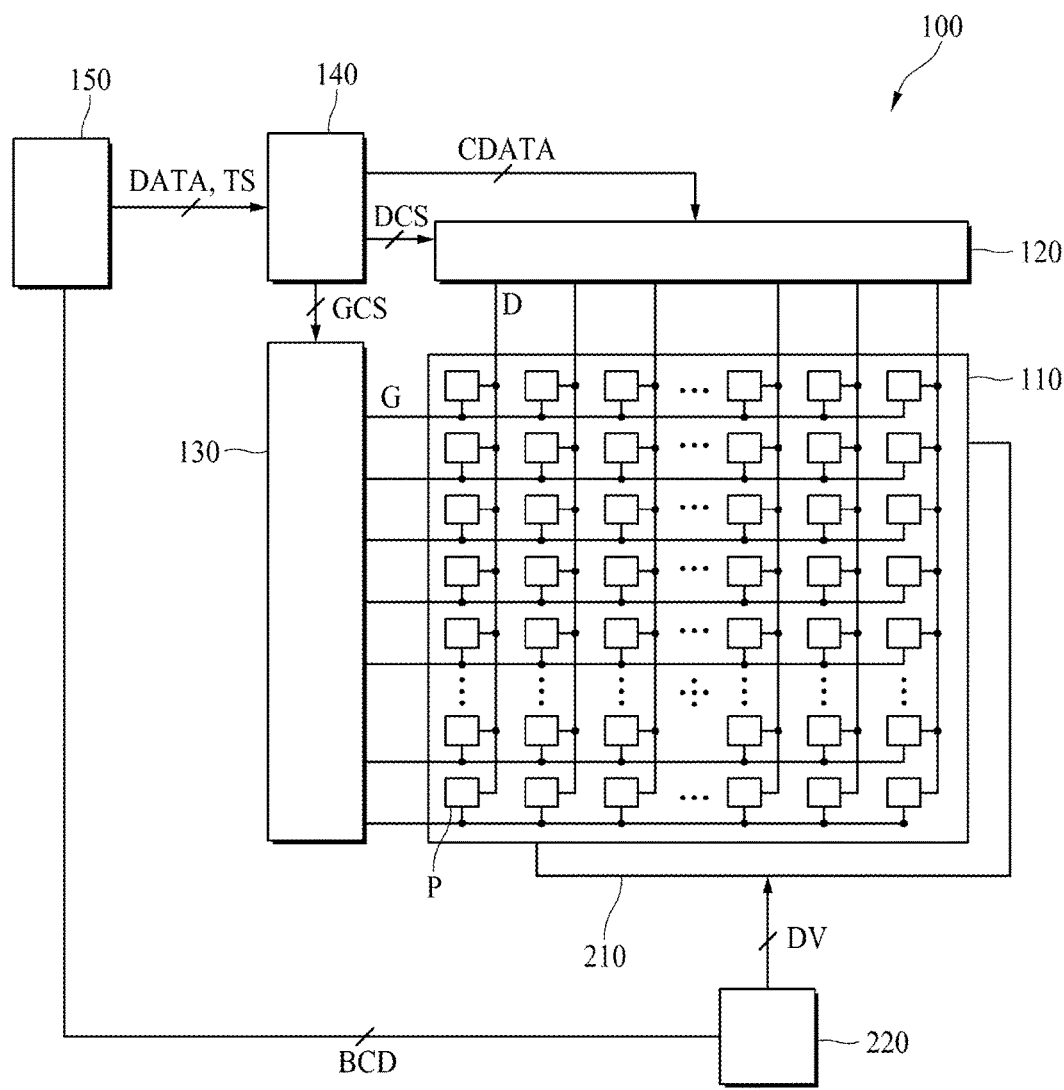
FIG. 1 is a block diagram of a display device according to an aspect of the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, exemplary aspects of the present disclosure will be described in detail with reference to the accompanying drawings.

FIG. 1 is a block diagram of a display device 100 according to an aspect of the present disclosure. The display device 100 according to an aspect of the present disclosure may include a display panel 110, a data driver 120, a gate driver 130, a timing controller 140, a system board 150, a backlight unit 210, and a backlight unit driver 220. The display device 100 according to an aspect of the present disclosure may be a display device including the backlight unit 210, or may be a display device where the display panel 110 self-emits light. Therefore, the backlight unit 210 and the backlight unit driver 220 may be optional elements.

Representative examples of display devices including the backlight unit 210 may include LCD devices. Hereinafter, therefore, an example where the display device 100 according to an aspect of the present disclosure is implemented with an LCD device will be described. However, the present aspect is not limited thereto. The display device 100 according to an aspect of the present disclosure may be an electrophoretic display device (EPD), a plasma display device (PDP), or an organic light emitting diode (OLED) device where pixels P of the display panel 110 self-emit light. Particularly, if the display device 100 is the OLED device, the backlight unit 210 and the backlight unit driver 220 are omitted.

The display panel 110 may display an image by using the pixels P. The display panel 110 may include a lower substrate, an upper substrate, and a liquid crystal layer disposed between the lower substrate and the upper substrate. A plurality of data lines D and a plurality of gate lines G may be arranged on the lower substrate of the display panel 110. The data lines D may be arranged to intersect the gate line G.

Figure 2:
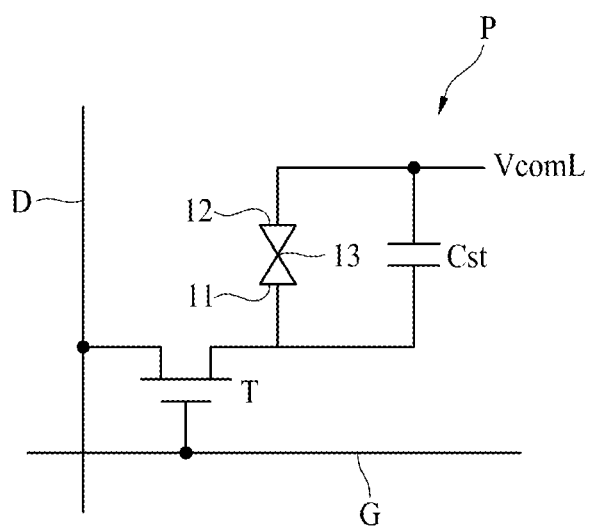
FIG. 2 is a circuit diagram of a pixel according to an aspect of the present disclosure.

FIG. 2 is a circuit diagram of a pixel P according to an aspect of the present disclosure. The pixels P may be respectively provided in a plurality of pixel areas defined by intersections of the data lines D and the gate line G. Each of the pixels P1 may be connected to a data line D and a gate line G. The pixels P may each include a transistor T, a pixel electrode 11, a common electrode 12, a liquid crystal layer 13, and a storage capacitor Cst. The transistor T may be turned on by a gate signal of the gate line G. The turned-on transistor T may supply a data voltage of the data line D to the pixel electrode 11. The common electrode 12 may be connected to a common line and may be supplied with a common voltage through the common line.

Each of the pixels P may drive a liquid crystal of the liquid crystal layer 13 with an electric field generated based on a potential difference between the data voltage supplied to the pixel electrode 11 and the common voltage supplied to the common electrode 12. Alignment of the liquid crystal may be changed according to the presence of the electric field and an intensity of the electric field, and thus, a transmittance of light incident from the backlight unit 210 may be controlled. As a result, the pixels P may display an image corresponding to a gray level which is set. The storage capacitor Cst may be disposed between the pixel electrode 11 and the common electrode 12. The storage capacitor Cst may hold a constant potential difference between the pixel electrode 11 and the common electrode 12.

In a vertical electric field mode such as a twisted nematic (TN) mode or a vertical alignment (VA) mode, the common electrode 12 may be disposed on the upper substrate. In a lateral electric field mode such as an in-plane switching (IPS) mode or a fringe field switching (FFS) mode, the common electrode 12 and the pixel electrode 11 may be disposed on the lower substrate. A liquid crystal mode of the display panel 110 may be implemented as any liquid crystal mode such as the TN mode, the VA mode, the IPS mode, and the FFS mode.

A black matrix, a color filter, and the like may be disposed on the upper substrate of the display panel 110. The color filter may be provided in plurality, and the color filters may be disposed in an opening uncovered by the black matrix. If the display panel 110 has a color filter on TFT (COT) structure, the black matrix and the color filters may be disposed on the lower substrate of the display panel 110.

A polarizer may be attached on each of the lower substrate and the upper substrate of the display panel 110, and an alignment layer for adjusting a pre-tilt angle of the liquid crystal may be provided on each of the lower substrate and the upper substrate. A column spacer for maintaining a cell gap of the liquid crystal layer may be provided between the lower substrate and the upper substrate of the display panel 110.

The data driver 120 may be supplied with a data driver control signal DCS and digital video data DATA from the timing controller 140. The data driver 120 may convert the digital video data DATA by using a positive or negative gamma compensation voltage according to the data driver control signal DCS to generate analog data voltages. The data driver 120 may output the analog data voltages. The analog data voltages output from the data driver 120 may be supplied to the data lines D of the display panel 110.

The gate driver 130 may be supplied with a gate driver control signal GCS from the timing controller 140. The gate driver 130 may generate gate signals according to the gate driver control signal GCS. The gate driver 130 may sequentially supply the gate signals to the gate line G of the display panel 110. Therefore, a data voltage of the data line D may be supplied to the pixel P which is supplied with the gate signal.

The timing controller 140 may be supplied with digital video data DATA and timing signals TS from the system board 150. The timing signals TS may include a horizontal synchronization signal Hsync, a vertical synchronization signal Vsync, an input data enable signal Input DE, a dot clock Dclk, etc.

The timing controller 140 may generate the gate driver control signal GCS and the data driver control signal DCS, based on the timing signals TS. The timing controller 140 may generate correction digital video data CDATA obtained by changing an inversion method and an inverted frame, in order to prevent a polarity of the digital video data DATA from concentrating on one side. The timing controller 140 may supply the gate driver control signal GCS to the gate driver 130. The timing controller 140 may supply the data driver control signal DCS and the correction digital video data CDATA to the data driver 120.

The system board 150 may supply the digital video data DATA to the timing controller 140 through an interface such as a low voltage differential signaling (LVDS) interface, a transition minimized differential signaling (TMDS) interface, or the like. The system board 150 may supply the timing signals TS to the timing controller 140. The system board 150 may supply a backlight unit control signal BCD to the backlight driver 220. The backlight unit control signal BCD may allow a level of a driving voltage DV, supplied from the backlight driver 220 to the backlight unit 210, to be adjusted for each of areas of the display panel 110. The backlight unit control signal BCD may be transmitted to have a serial peripheral interface (SPI) data format.

The backlight unit 210 may be supplied with the driving voltage DV from the backlight driver 220. The backlight unit 210 may emit back light, having brightness corresponding to the driving voltage DV, in a direction vertical to a surface of the display panel 110 for each area of the display panel 110. The backlight unit 210 may be implemented with an arbitrary light source that emits light. Generally, the backlight unit 210 is implemented with a light emitting diode (LED) array, or may be implemented with a fluorescent lamp or an ultraviolet (UV) LED.

The backlight unit 220 may be supplied with the backlight unit control signal BCD from the system board 150. The backlight driver 220 may supply the driving voltage DV having a level corresponding to the brightness of an image which is to be displayed for each area of the display panel 110, based on information included in the backlight unit control signal BCD.

Figure 3:
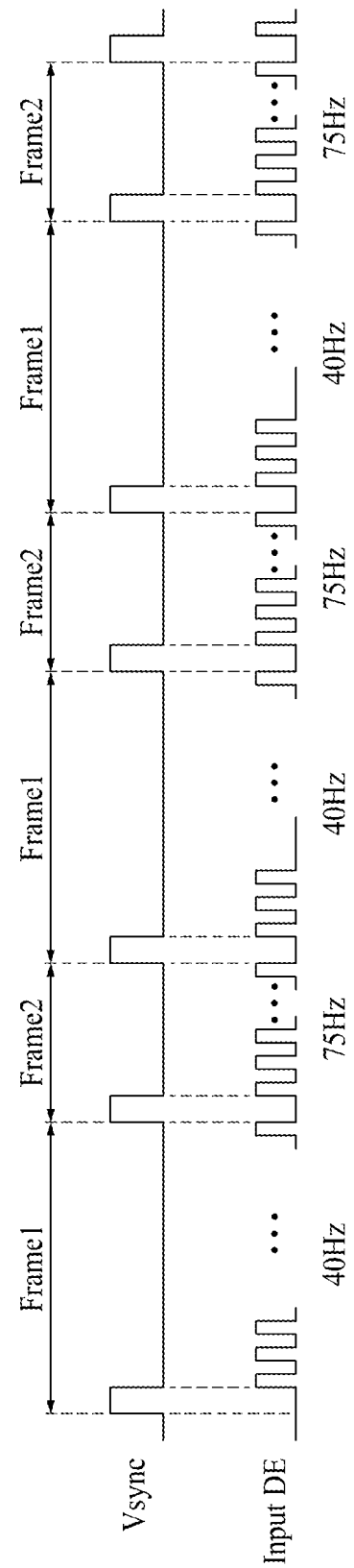
FIG. 3 is a waveform diagram showing a vertical synchronization signal and an input data enable signal in an adaptive sync mode.

FIG. 3 is a waveform diagram showing a vertical synchronization signal Vsync and an input data enable signal Input DE in an adaptive sync mode.

The adaptive sync mode (G-sync) may be a mode where a driving frequency varies at every frame, and thus, driving frequencies of all frames may differ. In FIG. 3, for convenience of description, in order to describe the case, which is actually the most used, an example where an odd-numbered frame Frame1 is driven at a first driving frequency of 40 Hz and an even-numbered frame Frame2 is driven at a second driving frequency of 75 Hz will be described below.

The vertical synchronization signal Vsync may have a high logic level at a time when each of the frames Frame1 and Frame2 starts to be driven, and in another period, may have a low logic level. The vertical synchronization signal Vsync may be based on a time when each of the frames Frame1 and Frame2 starts to be driven, namely, may synchronize the input data enable signal Input DE.

The input data enable signal Input DE may start to be supplied at a time when the vertical synchronization signal Vsync changes from a high logic level to a low logic level. The input data enable signal Input DE may continuously and alternately have a high logic level and a low logic level at the same frequency as a frequency of a predetermined dot clock DCLK in each of the frames Frame1 and Frame2. The input data enable signal Input DE may alternately have a high logic level and a low logic level, and at this time, may enable the digital video data DATA to be input.

Here, each of odd-numbered frames Frame1 may be driven at a driving frequency of 40 Hz, and thus, one odd-numbered frame Frame1 may have a time length of $1/40$ sec. Also, each of even-numbered frames Frame2 may be driven at a driving frequency of 75 Hz, and thus, one even-numbered frame Frame2 may have a time length of $1/75$ sec.

To provide a detailed description on this, each of the odd-numbered frames Frame1 may have a driving frequency which is a first frequency, and each of the even-numbered frames Frame2 may have a driving frequency which is a second frequency different from the first frequency. If the first frequency differs from the second frequency, a time length of each of the odd-numbered frames Frame1 may differ from that of each of the even-numbered frames Frame2. Also, if the first frequency is higher than the second frequency, a time length of each of the odd-numbered frames Frame1 may be shorter than that of each of the even-numbered frames Frame2. Also, if the first frequency is lower than the second frequency, a time length of each of the odd-numbered frames Frame1 may be longer than that of each of the even-numbered frames Frame2.

The data driver control signal may be supplied from the timing controller in order for a positive voltage (+) and a negative voltage (−) to be inverted therebetween by the data driver at every certain period. This is because when one of the positive voltage and the negative voltage is continuously applied, a direct current (DC) voltage stress is accumulated. Particularly, in LCD devices that realize a gray level by using alignment of liquid crystal, when the DC voltage stress is accumulated into the liquid crystal, the liquid crystal is tilted in a specific direction, and for this reason, the gray level is not normally realized. Therefore, in order to solve a problem where the liquid crystal is tilted, the positive voltage and the negative voltage are alternately supplied at every one frame.

FIG. 4 is an exemplary diagram showing a frame-based polarity in an adaptive sync mode where a driving frequency varies at every two frames.

As in FIG. 4, if a driving frequency varies at every two frames, first and second frames Frame1 and Frame2 may each have a driving frequency of 40 Hz, third and fourth frames Frame3 and Frame4 may each have a driving frequency of 75 Hz, fifth and sixth frames Frame5 and Frame6 may each have a driving frequency of 40 Hz, and seventh and eighth frames Frame7 and Frame8 may each have a driving frequency of 75 Hz.

In this case, a positive voltage (+) and a negative voltage (−) may be alternately supplied at every frame. Therefore, the positive voltage (+) may be supplied in the first frame Frame1, the third frame Frame3, the fifth frame Frame5, and the seventh frame Frame7, and the negative voltage (−) may be supplied in the second frame Frame2, the fourth frame Frame4, the sixth frame Frame6, and the eighth frame Frame8.

As in FIG. 4, in the case where a driving frequency varies at every two frames, a time length of a frame period where the positive voltage (+) is supplied may be the same as that of a frame period where the negative voltage (−) is supplied. That is, a time length of a frame period where the positive voltage (+) is supplied may be a sum of time lengths of the first frame Frame1, the third frame Frame3, the fifth frame Frame5, and the seventh frame Frame7, namely, may be a sum of time lengths of two frames each having a time length of $1/40$ sec and time lengths of two frames each having a time length of $1/75$ sec. Also, a time length of a frame period where the negative voltage (−) is supplied may be a sum of time lengths of the second frame Frame2, the fourth frame Frame4, the sixth frame Frame6, and the eighth frame Frame8, namely, may be a sum of time lengths of two frames each having a time length of $1/40$ sec and time lengths of two frames each having a time length of $1/75$ sec. Therefore, the DC voltage stress is not accumulated into the liquid crystal.

FIG. 5 is an exemplary diagram showing a frame-based polarity according to the related art in an adaptive sync mode where a driving frequency varies at every one frame.

As in FIG. 5, if a driving frequency varies at every one frame, a first frame Frame1, a third frame Frame3, a fifth frame Frame5, and a seventh frame Frame7 may each have a driving frequency of 40 Hz, and a second frame Frame2, a fourth frame Frame4, a sixth frame Frame6, and an eighth frame Frame8 may each have a driving frequency of 75 Hz.

In the related art, a positive voltage (+) and a negative voltage (−) may be alternately supplied at every frame. Therefore, the positive voltage (+) may be supplied in the first frame Frame1, the third frame Frame3, the fifth frame Frame5, and the seventh frame Frame7, and the negative voltage (−) may be supplied in the second frame Frame2, the fourth frame Frame4, the sixth frame Frame6, and the eighth frame Frame8.

In the aspect of FIG. 5, a time length of a frame period where the positive voltage (+) is supplied may differ from that of a frame period where the negative voltage (−) is supplied. That is, a time length of a frame period where the positive voltage (+) is supplied may be a sum of time lengths of the first frame Frame1, the third frame Frame3, the fifth frame Frame5, and the seventh frame Frame7, namely, may be a sum (i.e., $1/10$ sec) of time lengths of four frames each having a time length of $1/40$ sec. Also, a time length of a frame period where the negative voltage (−) is supplied may be a sum of time lengths of the second frame Frame2, the fourth frame Frame4, the sixth frame Frame6, and the eighth frame Frame8, namely, may be a sum (i.e., $4/75$ sec) of time lengths of four frames each having a time length of $1/75$ sec.

Therefore, in the aspect of FIG. 5, the positive voltage (+) may be supplied for $1/10$ sec which is a relatively long time, and the negative voltage (−) may be supplied for $4/75$ sec which is a relatively short time. In this case, since the positive voltage (+) is supplied for a relatively long time, the DC voltage stress is accumulated into a portion to which the positive voltage (+) is supplied.

To provide a detailed description on this, in the case where a driving frequency varies at every one frame, an odd-numbered frame may have a driving frequency which is a first frequency, and an even-numbered frame may have a driving frequency which is a second frequency different from the first frequency. Also, the positive voltage (+) or the negative voltage (−) may be continuously supplied to the odd-numbered frame, and the positive voltage (+) or the negative voltage (−) may be continuously supplied to the even-numbered frame so as to have a polarity different from that of the odd-numbered frame. Therefore, a time length of a frame period where the positive voltage (+) is supplied may differ from that of a frame period where the negative voltage (−) is supplied. As a result, the positive voltage (+) or the negative voltage (−) may be supplied for a time which is longer than a time for which a voltage having another polarity is supplied, and for this reason, the DC voltage stress is accumulated into a portion to which a voltage having one specific polarity is supplied.

In order to solve such a problem, in a case where the display device is driven in the adaptive sync mode where a driving frequency for the digital video data DATA is changed to the first driving frequency or the second driving frequency at every frame, the timing controller 140 according to the present aspect may correct the digital video data DATA to supply the correction digital video data CDATA, so that a time length of a period corresponding to the positive voltage (+) is the same as that of a period corresponding to the negative voltage (−). Accordingly, even in the adaptive sync mode, the DC voltage stress is not accumulated into a portion to which a voltage having one specific polarity is supplied.

Figure 6:
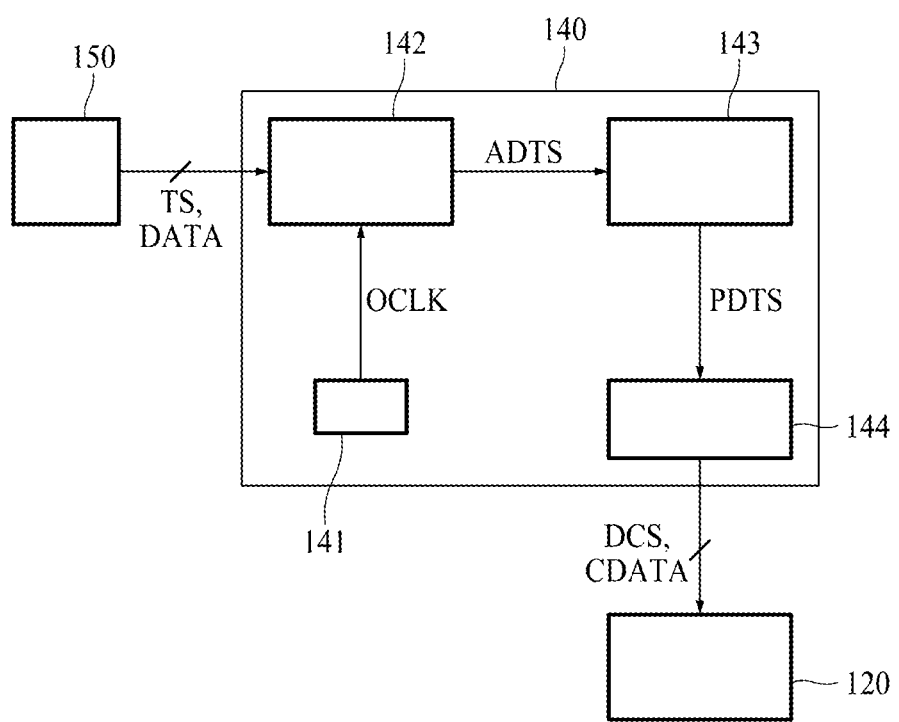
FIG. 6 is a block diagram illustrating in detail a timing controller according to an aspect of the present disclosure.

FIG. 6 is a block diagram illustrating in detail the timing controller 140 according to an aspect of the present disclosure. The timing controller 140 according to an aspect of the present disclosure may include an internal clock generator 141, a sensing unit 142, a polarity comparison unit 143, and a corrector 144.

The internal clock generator 141 may generate clocks used to drive the timing controller 140, and the clocks may be generated in the timing controller 140. The internal clock generator 141 may be implemented with an LC resonant circuit or an oscillator such as a crystal oscillator. Therefore, the internal clock generator 141 may generate an oscillation clock OCLK having an oscillation frequency which is implemented based on a design of the oscillator. The internal clock generator 141 may supply the generated oscillation clock OCLK to the sensing unit 142.

The sensing unit 142 may be supplied with the oscillation clock OCLK from the internal clock generator 141. Also, the sensing unit 142 may be supplied with the digital video data DATA and the timing signals TS from the system board 150. The sensing unit 142 may measure a time length of each of frames corresponding to the digital video data DATA, based on the number of clocks of the oscillation clock OCLK. The sensing unit 142 may compare a first period, corresponding to a time length of a frame which is driven at the first driving frequency, and a second period corresponding to a time length of a frame which is driven at the second driving frequency. When a difference value between the first period and the second period is equal to or more than a threshold value, the sensing unit 142 may sense a current driving mode as the adaptive sync mode. When the current driving mode is sensed as the adaptive sync mode, the sensing unit 142 may supply an adaptive sync mode sensing signal ADTS to the polarity comparison unit 143.

For example, when the threshold value is set to 0.01 sec per adjacent frame, in the aspect of the present disclosure shown in FIG. 3, a time length of an odd-numbered frame Frame1 may be 1/40 sec, and a time length of an even-numbered frame Frame2 may be 1/75 sec. A difference between the time length of the odd-numbered frame Frame1 and the time length of the even-numbered frame Frame2 may be 0.0167 (i.e., 1/40−1/75=0.0167), and thus, may correspond to the case where a difference value between the first period and the second period is greater than the threshold value, whereby the sensing unit 142 may sense a current driving mode as the adaptive sync mode.

The sensing unit 142 according to an aspect of the present disclosure may measure a time length of each frame by using the oscillation clock OCLK generated in the timing controller 140 and may sense a current driving mode as the adaptive sync mode, based on the threshold value. Therefore, when the sensing unit 142 senses the current driving mode as the adaptive sync mode, it can be seen that the DC voltage stress is accumulated despite frame inversion driving where a polarity is changed at every frame. Therefore, when the current driving mode is not the adaptive sync mode, the frame inversion driving may be performed as the related art, and then, only when the current driving mode is the adaptive sync mode, the timing controller 140 may convert the digital video data DATA into the correction digital video data CDATA, thereby allowing a time length of the positive voltage (+) to be the same as a time length of the negative voltage (−).

The polarity comparison unit 143 may be supplied with the adaptive sync mode sensing signal ADTS from the sensing unit 142. When the polarity comparison unit 143 is supplied with the adaptive sync mode sensing signal ADTS, the polarity comparison unit 143 may determine whether each frame for the digital video data DATA has the positive voltage (+) or the negative voltage (−). The polarity comparison unit 143 may compare a time length of a period corresponding to the positive voltage (+) with a time length of a period corresponding to the negative voltage (−).

When the time length of the period corresponding to the positive voltage (+) differs from the time length of the period corresponding to the negative voltage (−), the polarity comparison unit 143 may supply a polarity difference sensing signal PDTS to the corrector 144. Therefore, in a case where the DC voltage stress is predicted to occur because the time length of the period corresponding to the positive voltage (+) differs from the time length of the period corresponding to the negative voltage (−), the timing controller 140 may perform an operation for preventing accumulation of the DC voltage stress.

The corrector 144 may be supplied with the polarity difference sensing signal PDTS from the polarity comparison unit 143. When the corrector 144 is supplied with the polarity difference sensing signal PDTS, the corrector 144 may correct the digital video data DATA so that the number of frames which are driven at the first driving frequency and correspond to the positive voltage (+) is the same as the number of frames which are driven at the first driving frequency and correspond to the negative voltage (−). Also, the corrector 144 may correct the digital video data DATA so that the number of frames which are driven at the second driving frequency and correspond to the positive voltage (+) is the same as the number of frames which are driven at the second driving frequency and correspond to the negative voltage (−). The corrector 144 may supply the correction digital video data CDATA generated through correction to the data driver 120 along with the data driver control signal DCS.

When the number of frames which are driven at the first driving frequency and correspond to the positive voltage (+) is the same as the number of frames which are driven at the first driving frequency and correspond to the negative voltage (−), the number of frames corresponding to the positive voltage (+) may be the same as number of frames corresponding to the negative voltage (−), in frames having the same time length. Also, when the number of frames which are driven at the second driving frequency and correspond to the positive voltage (+) is the same as the number of frames which are driven at the second driving frequency and correspond to the negative voltage (−), the number of frames corresponding to the positive voltage (+) may be the same as the number of frames corresponding to the negative voltage (−), in frames having the same time length.

Therefore, a sum of time lengths of frames corresponding to the positive voltage (+) may always be the same as a sum of time lengths of frames corresponding to the negative voltage (−) irrespective of the first driving frequency and the second driving frequency. Accordingly, the DC voltage stress is not accumulated irrespective of a variation of a driving frequency.

FIG. 7 is an exemplary diagram showing a frame-based polarity according to an aspect of the present disclosure in an adaptive sync mode where a driving frequency varies at every one frame.

A detailed example, where the timing controller 140 allows a time length of a positive voltage (+) to be the same as that of a negative voltage (−), will be described below. In FIG. 7, similar to FIG. 5, it is assumed that a first frame Frame1, a third frame Frame3, a fifth frame Frame5, and a seventh frame Frame7 each have a driving frequency of 40 Hz, and a second frame Frame2, a fourth frame Frame4, a sixth frame Frame6, and an eighth frame Frame8 have a driving frequency of 75 Hz.

Here, the first frame Frame1, the third frame Frame3, the fifth frame Frame5, and the seventh frame Frame7 may be frames which are driven at a driving frequency of 40 Hz and correspond to the positive voltage (+). Also, the second frame Frame2, the fourth frame Frame4, the sixth frame Frame6, and the eighth frame Frame8 may be frames which are driven at a driving frequency of 75 Hz and correspond to the negative voltage (−).

In this case, an inversion method for one or more frames of the second frame Frame2, the fourth frame Frame4, the sixth frame Frame6, and the eighth frame Frame8 may be changed to a line inversion method. The line inversion method may be an inversion method where the positive voltage (+) and the negative voltage (−) are alternately supplied in units of one data line D or a certain number of data lines D in one frame. In FIG. 7, an example where the fourth frame Frame4 is changed to a first line inversion frame LINV1 and the eighth frame Frame8 is changed to a second line inversion frame LINV2 is illustrated.

However, the present aspect is not limited thereto. In other aspects, the second frame Frame2 may be changed to the first line inversion frame LINV1, and the sixth frame Frame6 may be changed to the second line inversion frame LINV2. Alternatively, depending on the case, an inversion method for one or more frames of the first frame Frame1, the third frame Frame3, the fifth frame Frame5, and the seventh frame Frame7 may be changed to the line inversion method. Due to such a change, a time length of the positive voltage (+) may be the same as that of the negative voltage (−), thereby preventing the DC voltage stress. Therefore, instead of changing an odd number of frames such as one frame, three frames, etc, to the line inversion method, an even number of frames such as two frames, fourth frames, etc. may be changed to the line inversion method.

As in FIG. 7, in the case where the fourth frame Frame4 and the eighth frame Frame8 are changed to the line inversion method, the fifth frame Frame5 next to the fourth frame Frame4 may be driven at the first driving frequency and may be changed to a frame corresponding to the negative voltage (−). To provide a brief description, in comparison with the related art, a polarity may be inversely supplied from the fifth frame.

In this case, in the first to third frames Frame1 to Frame3, two frames having a driving frequency of 40 Hz may correspond to the positive voltage (+), and one frame having a driving frequency of 75 Hz may correspond to the negative voltage (−). Also, in the fifth to seventh frames Frame5 to Frame7, two frames having a driving frequency of 40 Hz may correspond to the negative voltage (−), and one frame having a driving frequency of 75 Hz may correspond to the positive voltage (+). Therefore, in the first to eighth frames Frame1 to Frame8, a time length of the positive voltage (+) may be the same as that of the negative voltage (−). Accordingly, even when a frequency varies at every frame, the DC voltage stress is prevented from being accumulated due to the non-uniformity of the positive voltage (+) and the negative voltage (−).

To describe a general case, in a case where a frame which is driven at the first driving frequency and corresponds to the positive voltage (+) and a frame which is driven at the second driving frequency and corresponds to the negative voltage (−) are alternately provided, an inversion method for one or more frames which are driven at the second driving frequency may be changed to the line inversion LINV method. Also, at least one of frames subsequent to a frame changed to the line inversion LINV method may be changed to a frame which is driven at the first driving frequency and corresponds to the negative voltage (−).

To intuitively describe the same details, in a case where frames having different driving frequencies are alternately provided and the positive voltage (+) and the negative voltage (−) are alternately provided at every one frame, after a certain number of frames elapse, a polarity may be delayed by one frame and may be provided to a next frame in comparison with the related art. Also, after a polarity is delayed, a corresponding frame may be driven in the line inversion method. Accordingly, by summating a certain number of frames, a time length corresponding to the positive voltage (+) may be the same as a time length corresponding to the negative voltage (−).

FIG. 8 is an exemplary diagram showing a frame-based polarity of each line in line inversion according to an aspect of the present disclosure.

To describe an aspect with reference to FIG. 7, a fourth frame Frame4 which is a first frame of frames changed to the line inversion method may be defined as a first line inversion frame LINV1, and an eighth frame Frame8 which is a second frame of the frames changed to the line inversion method may be defined as a second line inversion frame LINV2.

In FIG. 8, it is illustrated that first to eighth lines are sequentially provided in each of the first and second line inversion frames LINV1 and LINV2, but the present aspect is not limited thereto. In other aspects, fewer lines or more lines may be provided. Also, the first to eighth lines may denote one data line D in the display panel, or may denote a plurality of adjacent data lines D. That is, in the line inversion method, a polarity may be changed in units of one data line or may be changed in units of a plurality of data lines, and thus, the first to eighth lines may denote a reference unit indicating that a polarity is changed in the line inversion method.

According to the aspect of FIG. 8, in the first line inversion frame LINV1, the positive voltage (+) may be provided in the first line, the third line, the fifth line, and the seventh line, and the negative voltage (−) may be provided in the second line, the fourth line, the sixth line, and the eighth line. In this case, in the second line inversion frame LINV2, the negative voltage (−) may be provided in the first line, the third line, the fifth line, and the seventh line, and the positive voltage (+) may be provided in the second line, the fourth line, the sixth line, and the eighth line. Therefore, in terms of the first to eighth lines, a time length of a period where the positive voltage (+) is provided may be the same as that of a period where the negative voltage (−) is provided.

To provide a detailed description on this, in frames changed to the line inversion method, a line having the positive voltage (+) in a first frame may have the negative voltage (−) in a second frame, and a line which has the negative voltage (−) in the first frame may have the positive voltage (+) in the second frame. Therefore, in each of lines, a time length of a period where the positive voltage (+) is provided may be the same as that of a period where the negative voltage (−) is provided. Accordingly, the DC voltage stress is not accumulated with respect to each line, in addition to a total frame period.

Moreover, in FIGS. 7 and 8, a method which prevents accumulation of the DC voltage stress by changing a driving frequency at every frame when being driven in the frame inversion method has been described in detail, but the present aspect is not limited thereto. That is, there are display devices which are fundamentally driven in the line inversion method.

In this case, a specific frame (for example, a first frame Frame1, a third frame Frame3, a fifth frame Frame5, and a seventh frame Frame7) may be driven at a driving frequency of 40 Hz, and in the first frame Frame1, the third frame Frame3, the fifth frame Frame5, and the seventh frame Frame7, more lines may be supplied with the positive voltage (+). Also, another frame (for example, a second frame Frame2, a fourth frame Frame4, a sixth frame Frame6, and an eighth frame Frame8) may be driven at a driving frequency of 75 Hz, and in the second frame Frame2, the fourth frame Frame4, the sixth frame Frame6, and the eighth frame Frame8, more lines may be supplied with the negative voltage (−).

Even in this case, a time length may be longer than a time length of a period where the positive voltage (+) is supplied, and thus, when the driving is continuously performed, the DC voltage stress is accumulated into a portion to which the positive voltage (+) is supplied.

In this case, by more supplying the negative voltage (−), a polarity or an inversion method may be changed so as to remove the DC voltage stress. In the present aspect, a polarity of a line inversion method for at least one of the first frame Frame1, the third frame Frame3, the fifth frame Frame5, and the seventh frame Frame7 may be changed so that more lines are supplied with the negative voltage (−). In this case, a time length of a period where the positive voltage (+) is provided may be the same as that of a period where the negative voltage (−) is provided, based on a sum of certain frames. Alternatively, when the DC voltage stress is excessively accumulated, at least one of the first frame Frame1, the third frame Frame3, the fifth frame Frame5, and the seventh frame Frame7 may be changed to a frame inversion method where the negative voltage (−) is supplied.

To provide a detailed description on this, in the present aspect, when a difference between a time for which the positive voltage (+) is supplied and a time for which the negative voltage (−) is supplied occurs in the first driving frequency and the second driving frequency in driving based on an arbitrary inversion method, a data voltage DATA may be corrected by changing an inversion method or a supply rate of a polarity voltage so as to increase a time for which the polarity voltage supplied for a short time is supplied. Accordingly, by summating a certain number of frames, a time length of a period where the positive voltage (+) is supplied may be the same as a time length of a period where the negative voltage (−) is supplied, thereby preventing accumulation of the DC voltage stress.

As described above, according to the aspects of the present disclosure, a driving frequency may vary at every frame, but a time difference between a positive voltage and a negative voltage does not occur in frame inversion driving where a polarity is changed at every frame. To this end, according to the aspects of the present disclosure, one frame of a plurality of frames may be driven in the line inversion method, and a polarity may be delayed up to a next frame, thereby allowing polarities to be alternately supplied. Therefore, according to the aspects of the present disclosure, a time length of the positive voltage may be the same as that of the negative voltage, and thus, the positive voltage and the negative voltage may be continuously supplied based on a frequency of another frame, thereby solving a problem where the DC voltage stress is accumulated due to a difference between the time length of the positive voltage and the time length of the negative voltage.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device comprising:
a display panel displaying an image;
a data driver supplying a data voltage to the display panel; and
a timing controller receiving digital video data and timing signals from a system board and supplying a data driver control signal to the data driver,
wherein, when the display device is driven in an adaptive sync mode where a driving frequency for the digital video data is changed to a first driving frequency or a second driving frequency at every frame, the timing controller corrects the received digital video data and supplies correction digital video data to the data driver to allow a time length of a period corresponding to a positive voltage to be the same as a time length of a period corresponding to a negative voltage.

2. The display device of claim 1, wherein the timing controller comprises:
an internal clock generator generating an oscillation clock used to drive the timing controller;
a sensing unit receiving the oscillation clock from the internal clock generator and receiving digital video data and timing signals from the system board;
a polarity comparison unit receiving an adaptive sync mode sensing signal from the sensing unit; and
a corrector receiving a polarity difference sensing signal from the polarity comparison unit.

3. The display device of claim 2, wherein the sensing unit measures a time length of each of frames corresponding to the digital video data based on the number of clocks of the oscillation clock.

4. The display device of claim 2, wherein the polarity comparison unit determines whether each frame for the digital video data has the positive voltage or the negative voltage.

5. The display device of claim 4, wherein the polarity comparison unit compares a time length of a period corresponding to the positive voltage and a time length of a period corresponding to the negative voltage.

6. The display device of claim 2, wherein the corrector is configured to correct the digital video data to allow the number of frames corresponding to the positive voltage driven at the first driving frequency to be the same as the number of frames corresponding to the negative voltage driven at the first driving frequency.

7. The display device of claim 2, wherein the corrector is configured to correct the digital video data to allow the number of frames corresponding to the positive voltage driven at the second driving frequency to be the same as the number of frames corresponding to the negative voltage driven at the second driving frequency.

8. The display device of claim 1, wherein the timing controller comprises a sensing unit sensing a current driving mode as the adaptive sync mode when a difference value between a first period corresponding to a time length of a frame driven at the first driving frequency and a second period corresponding to a time length of a frame driven at the second driving frequency is equal to or more than a threshold value.

9. The display device of claim 1, wherein the timing controller comprises a polarity comparison unit, when driven in the adaptive sync mode, comparing the time length of the period corresponding to the positive voltage and the time length of the period corresponding to the negative voltage.

10. The display device of claim 1, wherein the timing controller comprises a corrector correcting the digital video data to allow the number of frames corresponding to the positive voltage driven at the first driving frequency to be the same as the number of frames corresponding to the negative voltage driven at the first driving frequency.

11. The display device of claim 10, wherein the corrector is configured to correct the digital video data to allow the number of frames corresponding to the positive voltage driven at the second driving frequency to be the same as the number of frames corresponding to the negative voltage driven at the second driving frequency.

12. The display device of claim 1, wherein the timing controller changes an inversion method for one or more frames, which are driven at the second driving frequency, to a line inversion method and changes at least one of frames subsequent to a frame, changed to the line inversion method, to a frame which is driven at the first driving frequency corresponding to the negative voltage when a frame which is driven at the first driving frequency corresponding to the positive voltage and a frame which is driven at the second driving frequency corresponding to the negative voltage are alternately provided.

13. The display device of claim 12, wherein in the frames changed to the line inversion method, a line having the positive voltage in a first frame has the negative voltage in a second frame, and a line which has the negative voltage in the first frame has the positive voltage in the second frame.

14. The display device of claim 1, wherein the timing controller changes a polarity of the line inversion method for at least one of frames including more lines based on the first driving frequency so that more lines are supplied with the negative voltage, or changes the line inversion method to a frame inversion method which supplies the negative voltage when more lines are supplied with the positive voltage in the first driving frequency and more lines are supplied with the negative voltage in the second driving frequency in line inversion driving.

15. The display device of claim 1, wherein the timing controller changes a supply rate of a polarity voltage or an inversion method to increase a time for which the polarity voltage supplied for a short time is supplied when a difference between a time for which the positive voltage is supplied and a time for which the negative voltage is supplied occurs in the first driving frequency and the second driving frequency in driving based on an inversion method.

16. A driving method of a display device, comprising:
receiving, by a timing controller, digital video data and timing signals from a system board and supplying a data driver control signal to a data driver;
supplying, by the data driver, a data voltage to a display panel; and
displaying, by a display panel, an image,
wherein the receiving the digital video data and the timing signals comprises, when the display device is driven in an adaptive sync mode where a driving frequency for the digital video data is changed to a first driving frequency or a second driving frequency at every frame, correcting the digital video data to supply correction digital video data to the data driver so that a time length of a period corresponding to a positive voltage is the same as a time length of a period corresponding to a negative voltage.

17. The driving method of claim 16, wherein the receiving the digital video data and the timing signals comprises;
comparing a first period corresponding to a time length of a frame driven at the first driving frequency and a second period corresponding to a time length of a frame driven at the second driving frequency; and
sensing a current driving mode as the adaptive sync mode when a difference value between the first period and the second period is equal to or more than a threshold value.

18. The driving method of claim 16, wherein the receiving the digital video data and the timing signals comprises comparing the time length of the period corresponding to the positive voltage and the time length of the period corresponding to the negative voltage.

19. The driving method of claim 16, wherein the receiving the digital video data and the timing signals comprises correcting the digital video data so that the number of driven frames at the first driving frequency corresponding to the positive voltage is the same as the number of driven frames at the first driving frequency corresponding to the negative voltage, and the number of driven frames at the second driving frequency corresponding to the positive voltage is the same as the number of driven frames at the second driving frequency corresponding to the negative voltage.

20. A driving method for a display device driven in an adaptive sync mode, comprising:
alternately driving odd frames with a first polarity voltage at a first driving frequency, and even frames with a second polarity voltage at a second driving frequency; and
performing a line inversion driving after elapsing at least every three frames to allow a time length corresponding to the first polarity voltage to be the same as a time length corresponding to the second polarity voltage when the driven frames are summated.

* * * * *